US008385956B2

(12) United States Patent
Sennett et al.

(10) Patent No.: US 8,385,956 B2
(45) Date of Patent: *Feb. 26, 2013

(54) EMERGENCY NOTIFICATION SYSTEM FOR A PORTABLE DEVICE

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,642

(22) Filed: May 17, 2012

(65) Prior Publication Data

US 2012/0231757 A1 Sep. 13, 2012

Related U.S. Application Data

(63) Continuation of application No. 12/903,646, filed on Oct. 13, 2010, now Pat. No. 8,204,525, which is a continuation of application No. 11/472,078, filed on Jun. 21, 2006, now Pat. No. 7,844,286.

(60) Provisional application No. 60/788,508, filed on Mar. 31, 2006.

(51) Int. Cl.
H04W 4/00 (2009.01)

(52) U.S. Cl. .................. 455/466; 455/404.1; 455/414.2; 455/234.1; 455/426.1; 455/450.1; 455/152.1; 370/312; 370/330; 370/432; 370/338

(58) Field of Classification Search ............... 455/414.1, 455/404.2, 456.3, 412.1, 179.1, 152.1, 150.1, 455/404, 466, 404.1, 414.2, 234.1, 426.1, 455/450.1; 370/532, 32, 330, 432, 338
See application file for complete search history.

(56) References Cited

U.S. PATENT DOCUMENTS

| 4,052,720 | A | 10/1977 | McGregor et al. |
| 5,937,355 | A * | 8/1999 | Joong et al. .................. 455/466 |
| 6,115,596 | A | 9/2000 | Raith et al. |
| 6,160,989 | A | 12/2000 | Hendricks et al. |
| 6,377,925 | B1 | 4/2002 | Greene, Jr. et al. |
| 6,728,522 | B1 * | 4/2004 | Marrah et al. ............. 455/179.1 |
| 6,745,021 | B1 | 6/2004 | Stevens |
| 6,799,052 | B2 * | 9/2004 | Allegrezza et al. ........ 455/456.4 |
| 6,882,837 | B2 | 4/2005 | Fernandez et al. |
| 7,039,386 | B2 | 5/2006 | Kolsrud et al. |
| 7,084,775 | B1 | 8/2006 | Smith |
| 7,233,781 | B2 | 6/2007 | Hunter et al. |
| 7,277,858 | B1 | 10/2007 | Weaver et al. |
| 7,308,246 | B2 | 12/2007 | Yamazaki et al. |
| 7,460,108 | B2 | 12/2008 | Tamura |
| 2001/0014971 | A1 | 8/2001 | Nagashima et al. |
| 2003/0036379 | A1 | 2/2003 | Nikolai et al. |
| 2003/0050040 | A1 | 3/2003 | Yamazaki et al. |

(Continued)

OTHER PUBLICATIONS

OA dated Jan. 27, 2009 for U.S. Appl. No. 11/472,078, 15 pages.

(Continued)

Primary Examiner — Joseph Arevalo
(74) Attorney, Agent, or Firm — Turocy & Watson, LLP (57) ABSTRACT

Systems and methods for providing alerts to end users of networked enabled portable devices are provided so that the end users are made aware when broadcast emergency alerts are issued. In various embodiments, a portable device is enabled to receive information about an emergency alert broadcast of which the user should be aware, e.g., from the EAS, and to notify the user of the emergency alert. The user can be automatically taken to the emergency alert information by having the portable device automatically tune to the emergency broadcast information, the user can optionally retrieve the emergency information by tuning to the emergency broadcast channel, and/or the user can otherwise be presented with a reference to the emergency data, such as a link to the information.

16 Claims, 6 Drawing Sheets

U.S. PATENT DOCUMENTS

| | | |
|---|---|---|
| 2003/0069002 A1 | 4/2003 | Hunter et al. |
| 2003/0193394 A1 | 10/2003 | Lamb |
| 2003/0216133 A1 | 11/2003 | Poltorak |
| 2003/0229900 A1 | 12/2003 | Reisman |
| 2004/0031058 A1 | 2/2004 | Reisman |
| 2004/0034689 A1 | 2/2004 | Kacalek et al. |
| 2004/0136408 A1 | 7/2004 | Tomobe et al. |
| 2005/0037728 A1 | 2/2005 | Binzel et al. |
| 2005/0043066 A1 | 2/2005 | Seo |
| 2005/0129185 A1 | 6/2005 | McClelland et al. |
| 2005/0131740 A1 | 6/2005 | Massenzio et al. |
| 2005/0159132 A1 | 7/2005 | Wright et al. |
| 2005/0162267 A1 | 7/2005 | Khandelwal et al. |
| 2006/0040639 A1* | 2/2006 | Karl et al. .................. 455/404.1 |
| 2006/0058004 A1 | 3/2006 | Dolezal et al. |
| 2006/0079199 A1 | 4/2006 | Thompson |
| 2006/0178128 A1 | 8/2006 | Eaton et al. |
| 2007/0021099 A1 | 1/2007 | Sato |
| 2007/0037549 A1 | 2/2007 | Poltorak |
| 2008/0037576 A1 | 2/2008 | Hwang et al. |
| 2008/0194224 A1* | 8/2008 | Thorson et al. ............. 455/404.1 |

OTHER PUBLICATIONS

OA dated Feb. 4, 2009 for U.S. Appl. No. 11/472,085, 16 pages.
OA mailed Jun. 29, 2009 for U.S. Appl. No. 11/472,085, 19 pages.
OA mailed Dec. 29, 2008 for U.S. Appl. No. 11/553,200, 8 pages.
NOA mailed Jul. 17, 2009 for U.S. Appl. No. 11/553,200, 9 pages.
OA dated Jan. 15, 2010 for U.S. Appl. No. 11/472,078, 21 pages.
OA dated Dec. 30, 2009 for U.S. Appl. No. 11/472,085, 23 pages.
Notice of Allowance dated Jul. 9, 2010 for U.S. Appl. No. 11/472,078, 20 pages.
OA dated Jun. 23, 2010 for U.S. Appl. No. 11/472,085, 26 pages.
OA dated Dec. 2, 2010 for U.S. Appl. No. 11/472,085, 30 pages.

* cited by examiner

EMERGENCY NOTIFICATION SYSTEM FOR A PORTABLE DEVICE

CROSS REFERENCE TO RELATED APPLICATIONS

The present application is a continuation U.S. patent application Ser. No. 12/903,646, filed on Oct. 13, 2010, and entitled "EMERGENCY NOTIFICATION SYSTEM FOR A PORTABLE DEVICE," which is a continuation of U.S. patent application Ser. No. 11/472,078, filed on Jun. 21, 2006, and entitled "EMERGENCY NOTIFICATION SYSTEM FOR A PORTABLE DEVICE" (issued as U.S. Pat. No. 7,844,286 on Nov. 10, 2010), which claims priority to U.S. Provisional Application No. 60/788,508, filed Mar. 31, 2006, and entitled "NOTIFICATION SYSTEM FOR ALERTING USERS OF PORTABLE DEVICES OF EMERGENCIES." The subject matter disclosed herein is related to the subject matter disclosed in U.S. patent application Ser. No. 11/472,085, filed on Jun. 21, 2006 (now abandoned), and entitled "EMERGENCY NOTIFICATION SYSTEM FOR A PORTABLE DEVICE OF A USER HAVING A DISABILITY." The entireties of these applications are incorporated herein by reference.

TECHNICAL FIELD

The technical field generally relates to communication systems and more specifically relates to notifications and reporting of emergency alerts, such as those issued by the Emergency Alert System ("EAS"), to networked portable devices.

BACKGROUND

Existing broadcast technologies, such as Cell Broadcast, Multimedia Broadcast/Multicast Service ("MBMB"), and video broadcast, (e.g., Digital Video broadcast-Handheld ("DVB-H"), and MediaFLO), have been proposed to support emergency alert notification(s) to wireless subscribers. A problem with such broadcast technologies is that the end user does not know when an emergency alert is being broadcast, and thus does not know that he or she needs to tune to an appropriate broadcast channel for the emergency alert information.

While it has been proposed to continuously monitor the wireless subscriber's handset to determine if an emergency alert is being broadcast, continuous monitoring by the wireless subscriber's handset of the various broadcast technologies to determine if an emergency alert is being issued will likely have a major impact on the handset battery life depending upon which broadcast technology/technologies are being continuously monitored (e.g., Cell Broadcast). With current battery life limits, the end user experience would be impacted due to reduced handset battery life. Continuous monitoring also can impact network bandwidth unnecessarily.

SUMMARY

A mechanism for notifying users of EAS alerts via networked portable devices supporting telephony radio network and/or broadcast technologies does not require ongoing polling of an emergency communication channel. The mechanism provides alerts to end users of networked enabled portable devices such that end users are made aware when emergency alerts are issued. In various embodiments, a portable device is enabled to receive information about an emergency alert of which the user should be aware, e.g., from the EAS, and to notify the user of the portable device of the emergency alert without requiring action by the user. The user may then be automatically taken to the emergency alert information by having the portable device automatically tune to the emergency broadcast information, or the user may optionally retrieve the emergency information by tuning to the emergency broadcast channel, or the user may otherwise be presented with a reference to the emergency data (e.g., a link to the information).

BRIEF DESCRIPTION OF THE DRAWINGS

The foregoing and other objects, aspects and advantages of a emergency notification system for a portable device will be better understood from the following detailed description with reference to the drawings.

DETAILED DESCRIPTION OF ILLUSTRATIVE EMBODIMENTS

Various embodiments of a notification system for alerting users of portable devices (interchangeably referred to a user devices) of emergencies provide means for a portable device to receive information about an emergency alert of which the user should be aware, e.g., from the EAS, and to notify the user of the portable device of the emergency alert without requiring action by the user. Subsequent to receiving the notification, the user can automatically view the emergency alert information, retrieve the emergency information by tuning to the emergency broadcast channel, and/or be presented with a reference to the emergency data (e.g., a link to the information) so that a user can otherwise view the emergency information.

The impact on the battery life of the portable device and the impact on network bandwidth capacity due to implementation of the notification system are minimal because the notification system avoids continuous monitoring of broadcast technologies. Further, the notification system can provide notification to the user in real-time via an emergency alert mechanism which is implemented on the user device, and supported by one or more telephony radio networks.

In an example embodiment, the notification system adds an emergency alert indicator bit on control channel(s) of a telephony network with which the device communicates. When the user device detects the setting of the emergency alert indicator bit on the control channel(s) that it is monitoring, the user device is able to immediately lead the user to the emergency information, or instruct the user with pre-provisioned information about the emergency alert, and any associated broadcast channels that contain the emergency alert. In this fashion, the user device does not have to continuously monitor the broadcast channels for any possible emergency alerts.

In another example embodiment, a Short Message Service ("SMS") message is delivered to the user device via a telephony radio network, which is processed by the user device so that local knowledge is possessed on the portable device that an emergency alert has been issued that is intended for the user of the user device.

In another example embodiment, a message is received, e.g., via an SMS message, control channel, or data channel, which modifies a storage location, e.g., a bit, on the user device when the message is processed. Thus, when modified, the storage location indicates that an emergency alert has been issued that is intended for the user, and the user is notified.

The user may be notified via any one or more types of visual feedback by the user device (e.g., a display of the user device, backlighting, LEDs, etc.), auditory feedback (e.g., an alarm sound) or mechanical feedback (e.g., vibration of the phone). In addition, whether displayed automatically or at the option of the user, the emergency alert information can be rendered by the user device via a display (e.g., symbols, pictures, text, etc.), an audio speaker (e.g., pre-recorded EAS voice message, text-to-speech signal, etc.) and/or any other known form of communication (e.g., Morse code).

Figure 1:
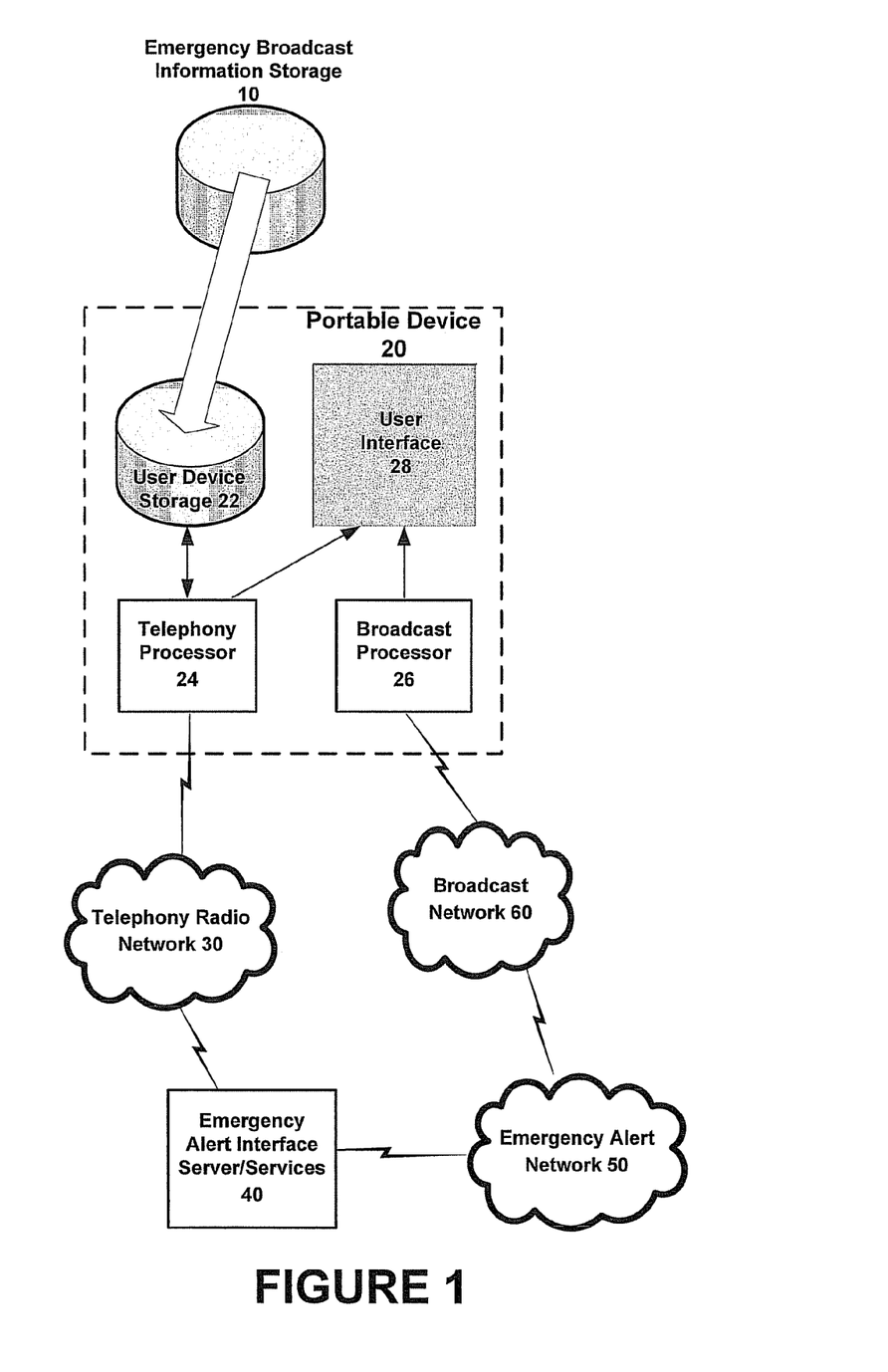
FIG. 1 illustrates an example reporting framework for informing users of portable devices of emergency broadcast alerts.

As shown in the example block diagram of FIG. 1, a portable device 20 is shown for receiving notifications of emergency alert information in accordance with the a notification system for alerting users of portable devices of emergencies. The portable device 20 can comprise any appropriate portable device. For example, portable devices 20 can comprise a mobile devices, a variety of computing devices including (a) portable media players, e.g., portable music players, such as MP3 players, walkmans, etc., (b) portable computing devices, such as laptops, personal digital assistants ("PDAs"), cell phones, portable email devices, thin clients, portable gaming devices, etc., (c) consumer electronic devices, such as TVs, DVD players, set top boxes, monitors, displays, etc., (d) public computing devices, such as kiosks, in-store music sampling devices, automated teller machines (ATMs), cash registers, etc., (e) navigation devices whether portable or installed in-vehicle and/or (f) non-conventional computing devices, such as kitchen appliances, motor vehicle controls (e.g., steering wheels), etc., or a combination thereof Moreover, while some embodiments are directed to systems and method for use in portable devices, as one of ordinary skill in the art can appreciate, the techniques of the notification system for alerting users of portable devices of emergencies are by no means limited to practice on portable devices, but also can apply to standalone computing devices, such as personal computers ("PCs"), server computers, gaming platforms, mainframes, or the like.

The portable device 20 comprises a storage device 22, a telephony processor 24, and a broadcast processor 26. The storage device 22 is populated with emergency broadcast information from a network-based emergency broadcast information database 10. As one of ordinary skill in the art can appreciate, this information can be provided and updated via over-the-air programming methodologies. Emergency broadcast information can, for instance, include the following types of information: (A) information about available broadcast technologies (e.g., Cell Broadcast, MBMS, DVB-H, MediaFLO, etc.), (B) information concerning which broadcast technologies or network(s), such as broadcast network 60, are specifically supported by the device 20, (C) information about emergency broadcast channels associated with each available broadcast technology, or a combination thereof.

Figure 2:
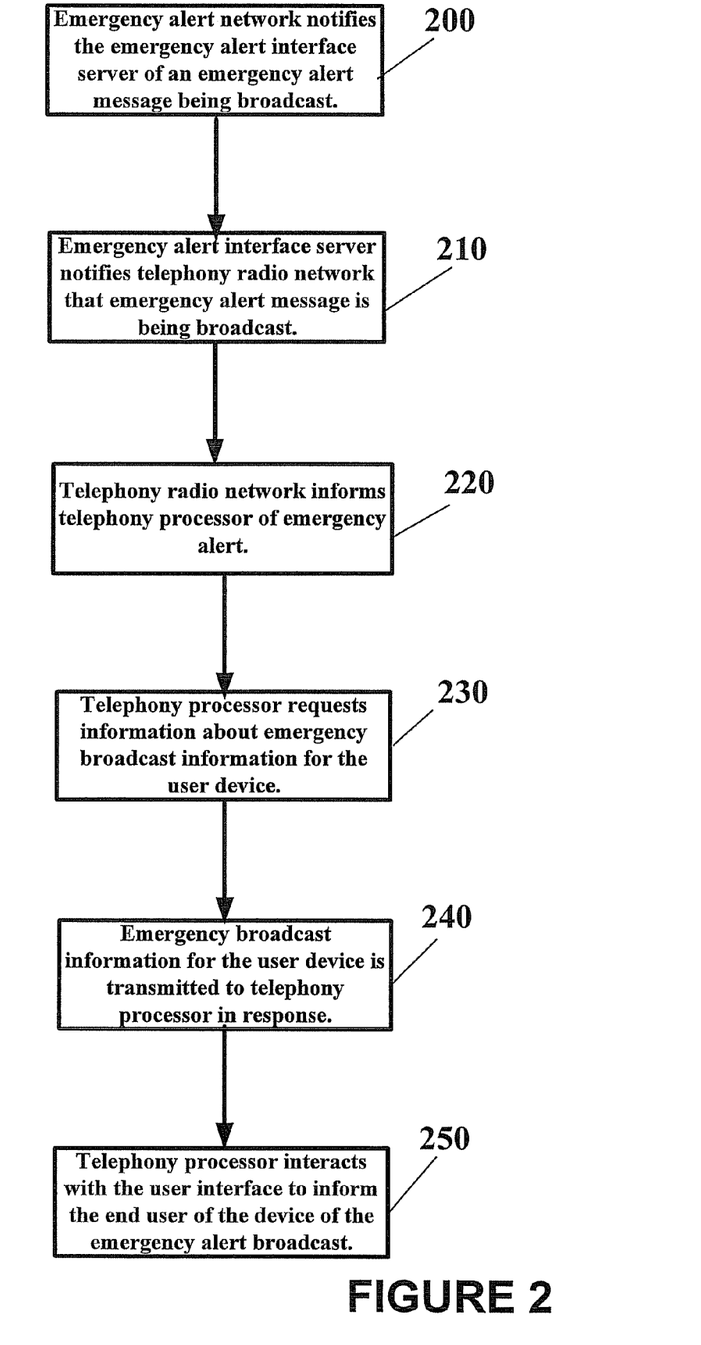
FIG. 2 is a flow diagram of an example process wherein a portable device becomes aware of an emergency alert.

FIG. 2 is a flow diagram of an example implementation of a process wherein a user device becomes aware of an emergency alert in accordance with the notification system for alerting users of portable devices of emergencies. FIG. 2 is described with reference to FIG. 1. FIG. 2 provides a description of exemplary implementations of various embodiments of the notification system for alerting users of portable devices of emergencies. At step 200, an emergency alert network 50 notifies the emergency alert interface server/services 40, which is communicatively coupled to network 30, such as a carrier network, that an emergency alert message is being broadcast. At step 210, the emergency alert interface server 40 notifies the telephony radio network 30 that an emergency alert is being broadcast using broadcast technologies. At step 220, the telephony radio network 30 informs the telephony processor 24 of portable device 20 that an emergency alert message is being broadcast, e.g., using a predefined, standardized indicator bit on at least one telephony network control channel, an SMS message, a data channel if available, or the like.

At step 230, the telephony network processor 24 on the user device 20 requests the user device database 22 to provide any pre-provisioned information about emergency broadcast information associated with user device 20. In response, at step 240, the user device database 22 returns any one or more of the following non-exhaustive, non-limiting, types of emergency alerting information to the telephony processor 24 on the user device 20: available broadcast technologies (e.g., Cell Broadcast, MBMS, DVB-H, MediaFLO), broadcast technologies supported by the device 20, and/or associated emergency broadcast channels for each available broadcast technology.

At step 250, using the information from the user device 20 retrieved at step 240, the telephony processor 24 interacts with the user interface 28 of the user device 20 to inform the end user that an emergency alert is being broadcast. The user interface 28 is not limited to display of information, however. Any known output device for a user device 20 may be utilized, whether visual, auditory and/or mechanical in operation. For example, special alert tones may be activated and special display graphics, symbols, text, etc, may be portrayed on a display of the user device 20 that inform the user that an emergency broadcast is being sent and to which channel or channels the user should tune for the emergency broadcast. In a non-limiting embodiment, a programmed soft key (or hardware control) may be provided for the end user to access the emergency broadcast immediately, or, optionally, subsequent to receiving notification, the user device 20 may automatically tune to the emergency broadcast.

Figure 3:
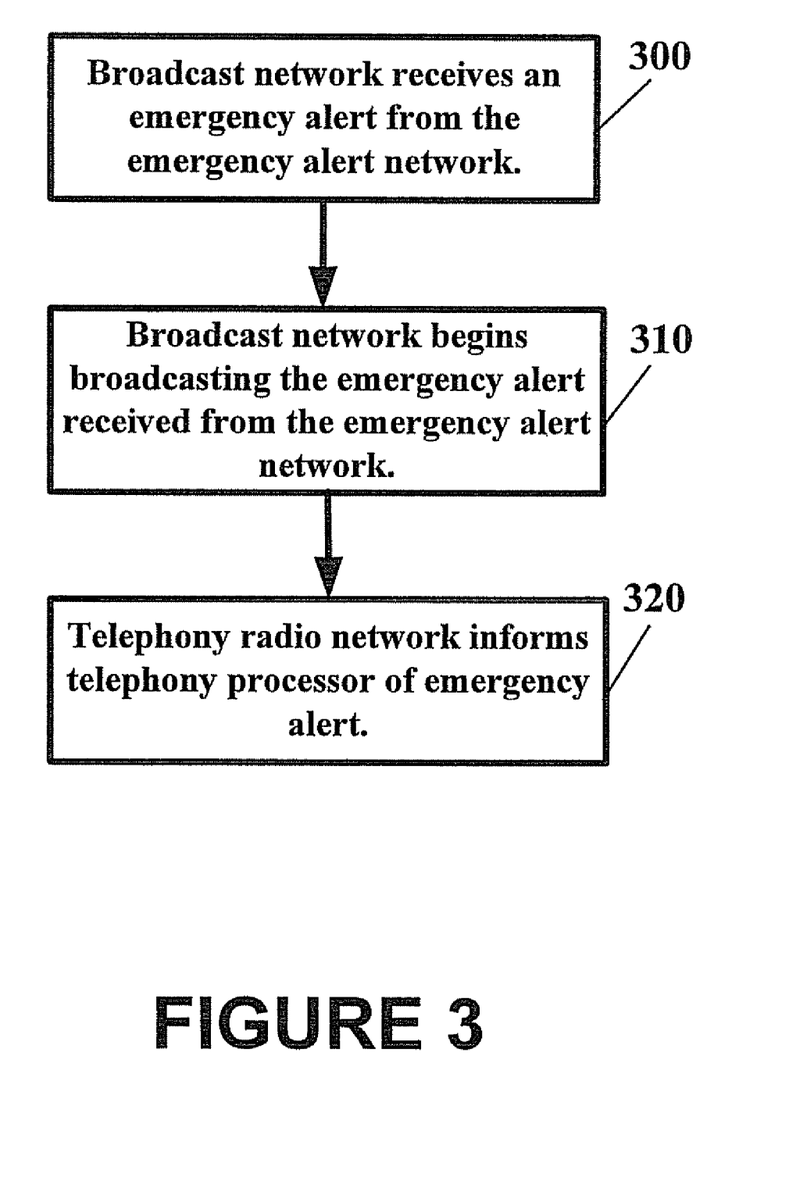
FIG. 3 is a flow diagram of an example process for delivering emergency information via broadcast networks supported by a broadcast processor of the portable device.

FIG. 3 is a flow diagram of an example process for delivering emergency information. FIG. 3 is described with reference to FIG. 1 and FIG. 2. The process depicted in FIG. 3 can proceed independent of or concurrently with the process depicted in FIG. 2. Emergency information, as depicted in FIG. 3, can be delivered via any broadcast technology supported by the broadcast processor 26 of the user device 20. In FIG. 3, at step 300, the broadcast network(s) 60 receives an emergency alert from the emergency alert network 50, such as the EAS. At step 310, the broadcast network starts broadcasting the received emergency alert. At step 320, whether activation occurs automatically or optionally at the behest of a user that has been notified of the alert (e.g., via the process depicted in FIG. 2), the associated emergency broadcast channel of the user device 20 is activated. The broadcast processor 26 receives the broadcasted emergency alert data and displays the emergency alert via the user interface 28 of the user device 20.

The following description sets forth some exemplary telephony radio networks and non-limiting operating environments for the EAS alert reporting services of the notification system for alerting users of portable devices of emergencies. The below-described operating environments should be considered non-exhaustive, however, and thus the below-described network architectures merely show how the services of the notification system for alerting users of portable devices of emergencies may be incorporated into existing network structures and architectures. It can be appreciated, however, that the notification system for alerting users of portable devices of emergencies can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the notification system for alerting users of portable devices of emergencies can be applied independently of the method of data transport, and do not depend on any particular network architecture, or underlying protocols.

Figure 4:
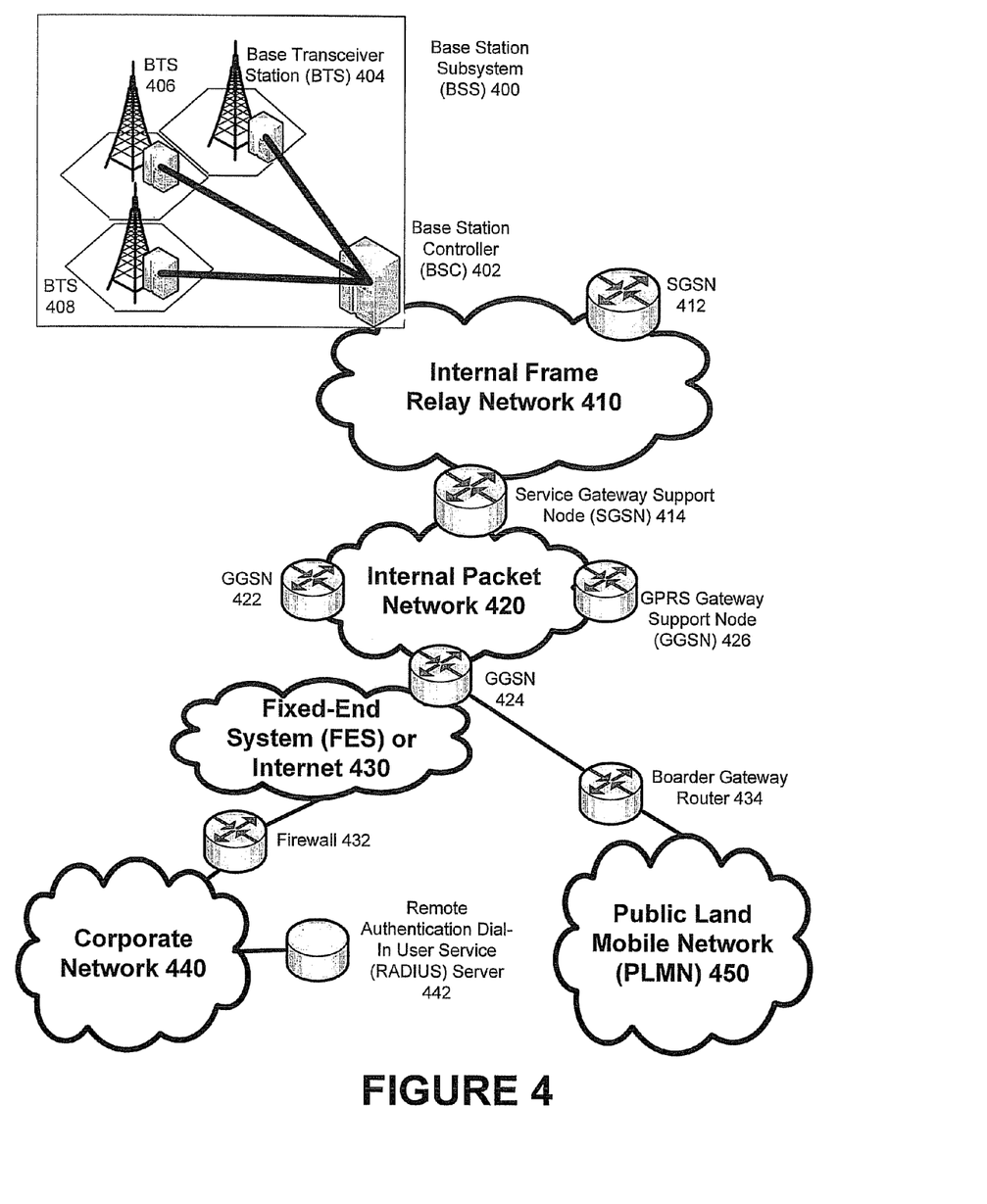
FIG. 4 illustrates an overview of an example network environment suitable for service by the emergency notification system for a portable device.

FIG. 4 depicts an overall block diagram of an exemplary packet-based mobile cellular network environment, such as a GPRS network, in which the notification system for alerting users of portable devices of emergencies can be practiced. In an example configuration, the telephony radio network 30, the emergency alert interface server/services 40, the emergency alert network 50, and the broadcast network 60 are encompassed by the network environment depicted in FIG. 4. In such an environment, there are a plurality of Base Station Subsystems ("BSS") 400 (only one is shown); each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices (e.g., portable device 20) become connected to the wireless network. In exemplary fashion, the packet traffic originating from user devices (e.g., user device 20) is transported via an over-the-air interface to a BTS 408, and from the BTS 408 to the BSC 402.

Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
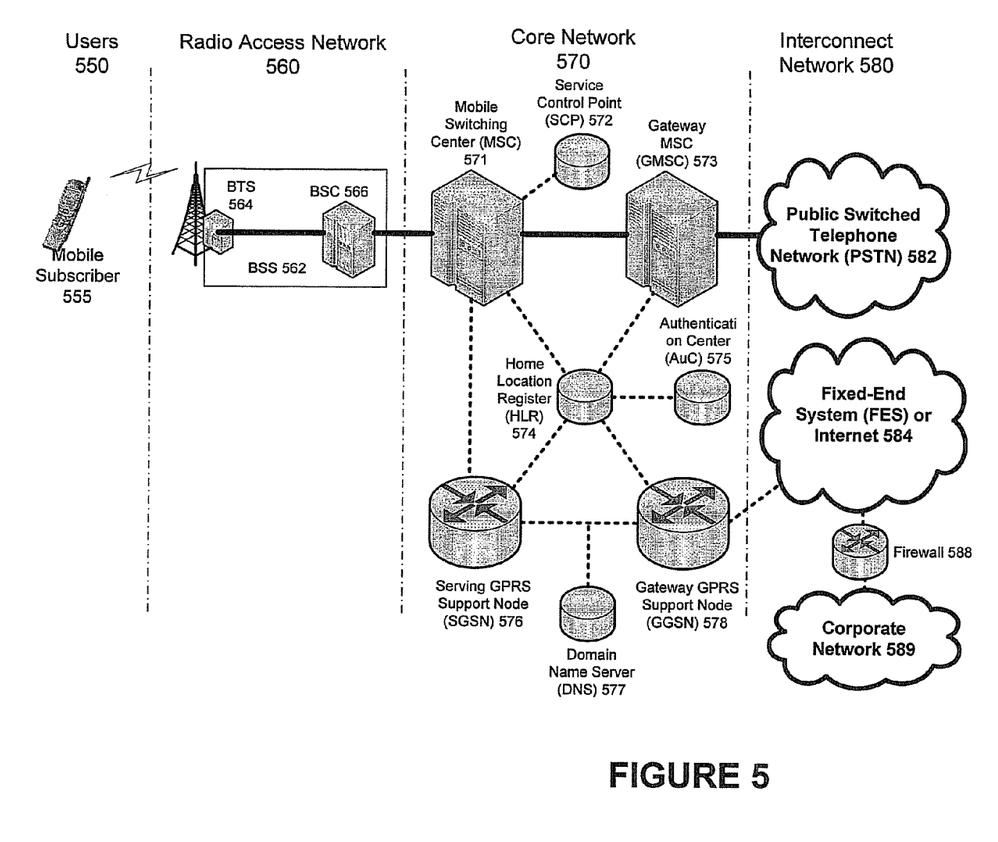
FIG. 5 illustrates an example GPRS network architecture that may incorporate various aspects of the emergency notification system for a portable device.

FIG. 5 illustrates an architecture of a typical GPRS network as segmented into four groups: users 550, radio access network 560, core network 570, and interconnect network 580. In an example configuration the telephony radio network 30, the emergency alert interface server/services 40, the emergency alert network 50, and the broadcast network 60 are encompassed by the radio access network 560, core network 570, and interconnect network 580. Users 550 comprise a plurality of end users (though only mobile subscriber 555 is shown in FIG. 5). In an example embodiment, the device depicted as mobile subscriber 555 comprises portable device 20. Radio access network 560 comprises a plurality of base station subsystems such as BSSs 562, which include BTSs 564 and BSCs 566. Core network 570 comprises a host of various network elements. As illustrated here, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572.

The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the portable device 20, used by an end user of the mobile cellular service. When a mobile subscriber turns on his or her mobile device, the mobile device goes through an attach process by which the mobile device attaches to an SGSN of the GPRS network. In FIG. 5, when mobile subscriber 555 initiates the attach process by turning on the network capabilities of the mobile device, an attach request is sent by mobile subscriber 555 to SGSN 576. The SGSN 576 queries another SGSN, to which mobile subscriber 555 was attached before, for the identity of mobile subscriber 555. Upon receiving the identity of mobile subscriber 555 from the other SGSN, SGSN 576 requests more information from mobile subscriber 555. This information is used to authenticate mobile subscriber 555 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 555 was attached before, to cancel the location process for mobile subscriber 555. HLR 574 then notifies SGSN 576 that the location update has been performed. At this time, SGSN 576 sends an Attach Accept message to mobile subscriber 555, which in turn sends an Attach Complete message to SGSN 576.

After attaching itself with the network, mobile subscriber 555 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 555. The mobile subscriber 555 uses an algorithm to send the user identification (ID) and password to SGSN 576. The SGSN 576 uses the same algorithm and compares the result. If a match occurs, SGSN 576 authenticates mobile subscriber 555.

Next, the mobile subscriber 555 establishes a user session with the destination network, corporate network 589, by going through a Packet Data Protocol ("PDP") activation process. Briefly, in the process, mobile subscriber 555 requests access to the Access Point Name ("APN"), for example, UPS.com (e.g., which can be corporate network 589 in FIG. 3) and SGSN 576 receives the activation request from mobile subscriber 555. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 555.

Once activated, data packets of the call made by mobile subscriber 555 can then go through radio access network 560, core network 570, and interconnect network 580, in a particular fixed-end system or Internet 584 and firewall 588, to reach corporate network 589.

Thus, network elements that can invoke the functionality of the EAS alert reporting in accordance the emergency notification system for a portable device of a user can include but are not limited to Gateway GPRS Support Node tables, Fixed End System router tables, firewall systems, VPN tunnels, and any number of other network elements as required by the particular digital network.

Figure 6:
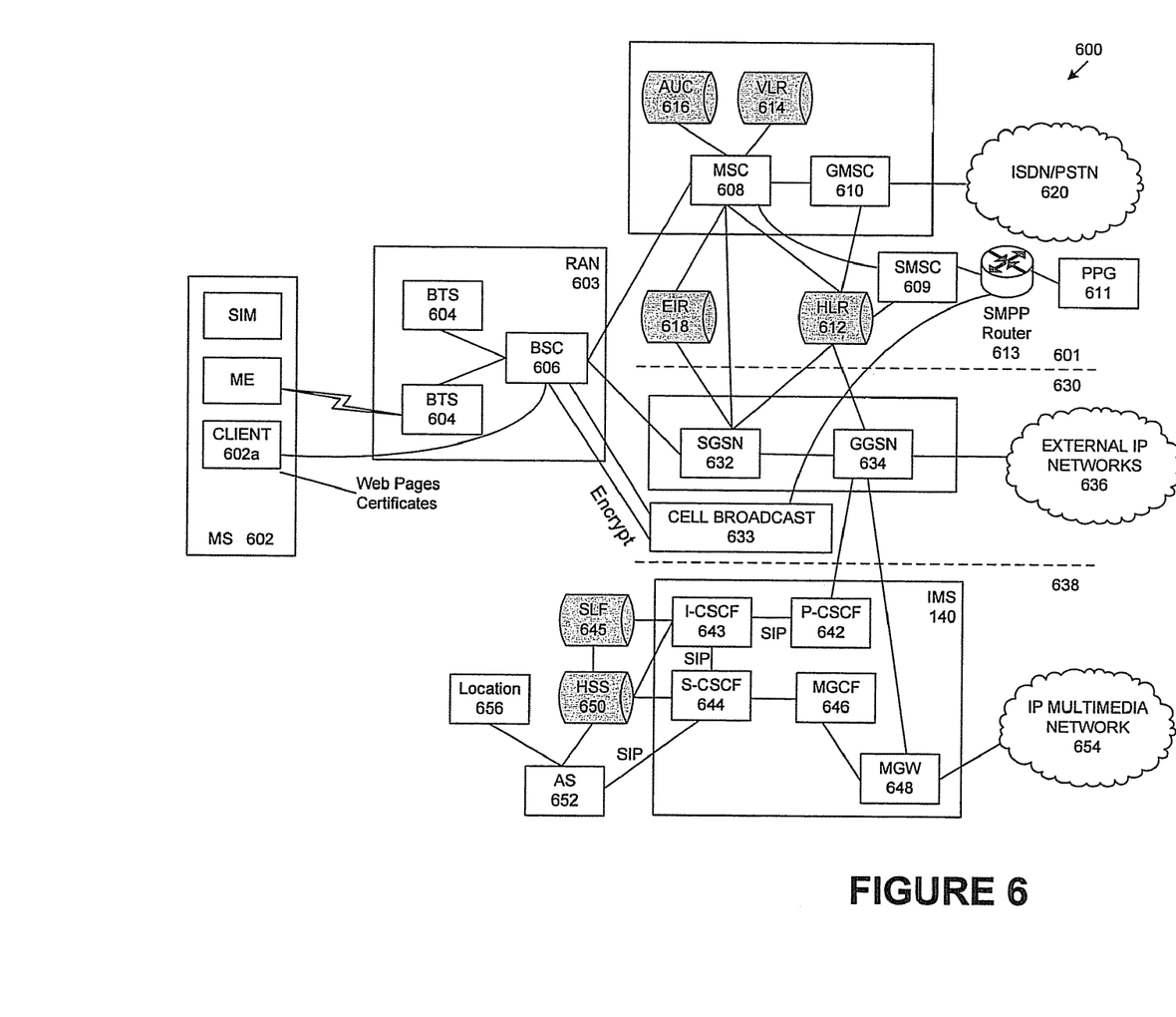
FIG. 6 illustrates an example alternate block diagram of an exemplary GSM/GPRS/IP multimedia network architecture in which the emergency notification system for a portable device may be employed.

FIG. 6 illustrates another exemplary block diagram view of a GSM/GPRS/IP multimedia network architecture 600 in which EAS alerting and reporting of the notification system for alerting users of portable devices of emergencies may be incorporated. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer (e.g., portable device 20) that is used by mobile subscribers, with a Subscriber identity Module (SIM). The SIM includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 633 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 638 was introduced with 3GPP Release 5, and includes an IP multimedia subsystem (MS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice).

The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments a notification system for alerting users of portable devices of emergencies have been described in connection with various computing devices, the underlying concepts can be applied to any computing device or system capable of providing a notification for alerting users of portable devices of emergencies. The various techniques described herein can be implemented in connection with hardware or software or, where appropriate, with a combination of both. Thus, the methods and apparatus for a notification system for alerting users of portable devices of emergencies, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing a notification for alerting users of portable devices of emergencies. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a notification system for alerting users of portable devices of emergencies also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a notification system for alerting users of portable devices of emergencies. When implemented on a general-purpose processor, the program code combines with the processor to provide a unique apparatus that operates to invoke the functionality of a notification system for alerting users of portable devices of emergencies. Additionally, any storage techniques used in connection with a notification system for alerting users of portable devices of emergencies can invariably be a combination of hardware and software.

While a notification system for alerting users of portable devices of emergencies has been described in connection with the various embodiments of the various figures, it is to be understood that other similar embodiments can be used or modifications and additions can be made to the described embodiment for performing the same function of the notification system for alerting users of portable devices of emergencies without deviating therefrom. For example, one skilled in the art will recognize that the notification system for alerting users of portable devices of emergencies as described in the present application may apply to any environment, whether wired or wireless, and may be applied to any number of such devices connected via a communications network and interacting across the network. Therefore, the notification system for alerting users of portable devices of emergencies should not be limited to any single embodiment, but rather should be construed in breadth and scope in accordance with the appended claims.

The invention claimed is:

1. A communication device, comprising:
 a memory to store computer-executable instructions; and
 a processor, communicatively coupled to the memory, that facilitates execution of the computer-executable instructions to perform operations, comprising:
  storing emergency broadcast information that specifies a broadcast technology supported by the communication device and an emergency broadcast channel associated with the broadcast technology;
  updating the emergency broadcast information with data from a remote location via over-the-air programming;
  retrieving a subset of the emergency broadcast information in response to detection of an emergency indicator bit received on a control channel of a telephony network, the emergency indicator bit indicative of an occurrence of an emergency broadcast; and
  in response to determining that the emergency broadcast is relevant based on a defined criterion:
   rendering a visual notification that the emergency broadcast is being transmitted, wherein the notification includes the subset of the emergency broadcast information,
   automatically tuning the communication device to the emergency broadcast channel; and
   storing a record of the occurrence of the emergency broadcast.

2. The communication device of claim 1, wherein the operations further comprise detecting the emergency indicator bit on a data channel.

3. The communication device of claim 1, wherein the operations further comprise detecting the emergency indicator bit in a text message.

4. The communication device of claim 1, wherein the notification identifies the emergency broadcast channel based on the subset of the emergency broadcast information.

5. The communication device of claim 1, wherein the operations further comprise receiving the emergency broadcast over the emergency broadcast channel.

6. The communication device of claim 5, wherein the operations further comprise rendering a soft key in response to the detection of the emergency indicator bit, and tuning the communication device to the emergency broadcast channel in response to selection of the soft key.

7. The communication device of claim 1, wherein the operations further comprise rendering audible output indicating that the emergency broadcast is being transmitted.

8. The communication device of claim 1, wherein the operations further comprise rendering mechanical output indicating that the emergency broadcast is being transmitted.

9. A method, comprising:
 storing, by a communication device including a processor, emergency broadcast information identifying a broadcast technology supported by the communication device and an emergency broadcast channel associated with the broadcast technology;
 updating, by the communication device, the emergency broadcast information with data from a remote location using over-the-air programming;
 retrieving, by the communication device, a subset of the emergency broadcast information in response to receiving an emergency indicator bit on a control channel of a telephony network, the emergency indicator bit indicating that emergency information is being broadcast; and in response to determining that the emergency indicator bit is relevant according to a criterion, rendering, by the communication device, a visual notification that the emergency information is being broadcast, the notification including the subset of the emergency broadcast information, automatically tuning, by the communication device, to the emergency broadcast channel; and storing, by the communication device, a record of the emergency information.

10. The method of claim 9, further comprising receiving, by the communication device, the emergency indicator bit over a data channel.

11. The method of claim 9, further comprising receiving, by the communication device, the emergency indicator bit via a text message.

12. The method of claim 9, wherein the rendering includes rendering an identification of the emergency broadcast channel based on the subset of the emergency broadcast information.

13. The method of claim 9, wherein the rendering includes rendering a soft key that, in response to activation, tunes the communication device to the emergency broadcast channel.

14. The method of claim 9, wherein the rendering comprises rendering audio feedback indicating that the emergency broadcast is in effect.

15. A tangible computer-readable medium having stored thereon computer-executable instructions that, in response to execution, cause a mobile device including a processor to perform operations, comprising:

storing emergency broadcast information specifying a broadcast technology supported by the mobile device and an emergency broadcast channel associated with the broadcast technology;

updating the emergency broadcast information with data from a remote location received via over-the-air programming;

in response to receiving an indication, over a control channel of a telephony network, that an emergency broadcast is in effect, requesting a subset of the emergency broadcast information, rendering a visual notification that the emergency broadcast is in effect, the notification including the subset of the emergency broadcast information, automatically tuning the mobile device to the emergency broadcast channel; and storing a record of the emergency broadcast.

16. The tangible computer-readable medium of claim 15, wherein the rendering comprises rendering information that identifies the emergency broadcast channel based on the subset of the emergency broadcast information.

* * * * *